B. C. OLMSTED.
SHOVEL.
APPLICATION FILED SEPT. 22, 1908.

969,975. Patented Sept. 13, 1910.

Inventor
B. C. Olmsted

Witnesses

By ———, Attorneys

UNITED STATES PATENT OFFICE.

BERTRAND C. OLMSTED, OF DEER CREEK, OKLAHOMA.

SHOVEL.

969,975.

Specification of Letters Patent.

Patented Sept. 13, 1910.

Application filed September 22, 1908. Serial No. 454,169.

*To all whom it may concern:*

Be it known that I, BERTRAND C. OLMSTED, citizen of the United States, residing at Deer Creek, in the county of Grant and State of Oklahoma, have invented certain new and useful Improvements in Shovels, of which the following is a specification.

The object of my invention is to provide a shovel, spade or analogous implement employing a blade and handle, wherein the several parts comprising the tool will be capable of repair or substitution without unnecessary loss or abandonment of coöperating sections.

In ordinary shovels the blade and handle socket are formed of one piece of metal and a total depreciation in value is frequently necessary owing to a minor defect or broken part which when repaired becomes a point of chronic weakness and renders the shovel incapable of performing the function for which it was designed. With my invention this objectionable feature is eliminated with due consideration to original cost of production and simplicity in construction, the sections being secured together in such manner as to permit individual replacement thus facilitating and reducing the cost of repair work.

Figure 1:
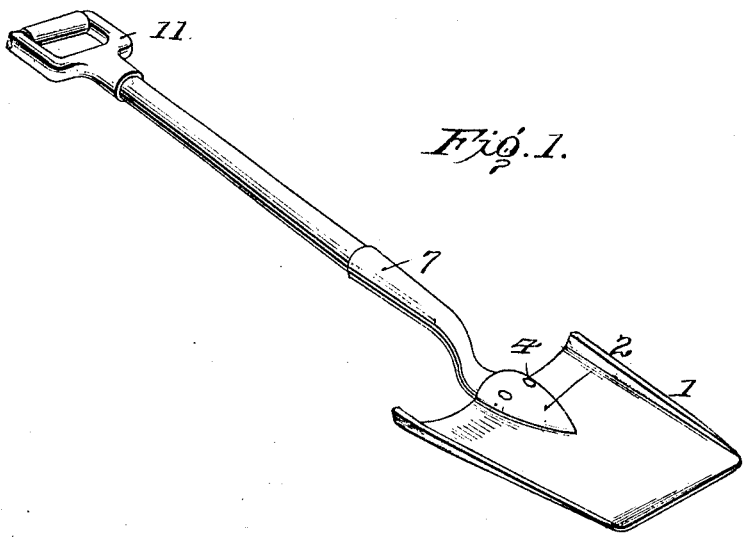
Figure 2:
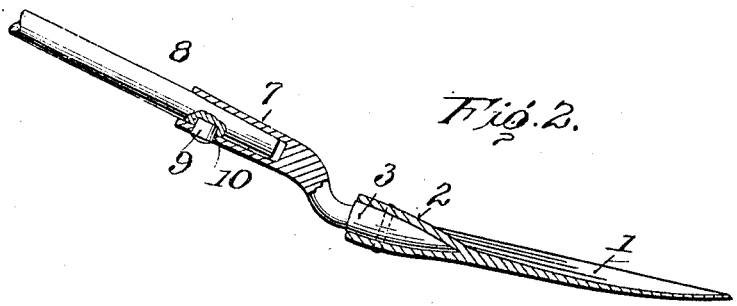
Figure 3:
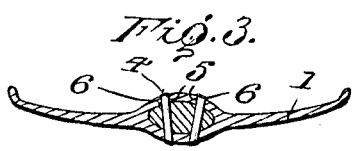

For a full understanding of the invention and the merits thereof and also to acquire a knowledge of the details of construction and the means for effecting the result, reference is to be had to the following description and accompanying drawings in which:

Figure 1 is a perspective view of the implement, Fig. 2 is a longitudinal sectional view, and, Fig. 3 is a transverse sectional view.

Corresponding and like parts are referred to in the following description and indicated in all the views of the drawings by the same reference characters.

Referring to the drawings the numeral 1 designates a shovel blade formed at the handle end with a longitudinal inwardly tapering socket 2, elliptical in cross section and located intermediate of the side edges and opening at the rear edge of the blade.

The numeral 3 designates a shank having its forward end enlarged, approximately triangular in form, laterally rounded, and tapered and thereby adapted to fit within the socket 2 and detachably secured within said socket as by rivets 4 extending through transverse openings 5 in said shank, and openings 6 in both sides of the socket. Said shank, beyond the triangular head is upwardly curved and then rearwardly extended.

The rear end of the shank 3 is provided with a socket 7 arranged for the reception of a handle 8 which is detachably retained within said socket by a wedge or plug 9 introduced between the handle and socket through the slot 10, and a grip 11 of any desired type is detachably secured to the opposite end of the handle. The bend formed in the shank 3 between the socket portion thereof and the head 3ª, is of especial value, inasmuch as it provides for the use of a straight handle instead of a handle which is curved, the construction thus permitting of an easy substitution of one handle for another and the use of any straight piece of material as a handle, instead of its being necessary to have a handle which is curved in order to bring the shovel blade below the level of the handle.

With arrangement of the several parts the shovel sections with the exception of the handle 8 are preferably constructed of metal and detachably secured one to the other as shown, and in a manner permitting the ready disconnection and substitution of a broken or defective part. The handle 8 may be constructed of wood and secured within the socket 7, as specified, and the grip 11 attached at the opposite end of the handle in any convenient way.

The numerous advantages of a sectional shovel constructed as herein described will be apparent in that the life of the implement or period of usefulness will be extended by the replacement from time to time of the various broken or defective sections.

Having thus described the invention, what is claimed as new is:

As a new article of manufacture, a shovel comprising a blade having at its rear edge a longitudinally extending uniformly tapered triangular socket opening outward through the rear edge of the shovel, said socket being rounded laterally, a shank separate from the blade and having an enlarged forward end approximately triangular in form, laterally rounded uniformly tapered and fitting said socket snugly, said shank, beyond the triangular head thereof, being upwardly curved above the face of the shovel, and then rearwardly extended, the rear end of the shank beyond the upwardly curved portion thereof being formed with a longitudinally extending tapered socket, a slot extending through the back wall of the socket, fastening rivets disposed in a line transverse to the longitudinal axis of the shank through the rear end of the shovel blade and through the head of the shank, a handle fitted at its forward end into the socket in said shank and having a recess registering with the slot, and a tapered plug passing through the slot and into the recess and detachably retaining the end of the handle in the socket.

In testimony whereof I affix my signature in presence of two witnesses.

BERTRAND C. OLMSTED. [L. S.]

Witnesses:
   F. M. ROBERTS,
   D. W. HARRIS.